(12) United States Patent
Alzoubi

(10) Patent No.: US 12,240,092 B1
(45) Date of Patent: Mar. 4, 2025

(54) HAMMER ASSEMBLY FOR A POWER TOOL

(71) Applicant: Ayham Samir Alzoubi, Slidell, LA (US)

(72) Inventor: Ayham Samir Alzoubi, Slidell, LA (US)

(*) Notice: Subject to any disclaimer, the term of this patent is extended or adjusted under 35 U.S.C. 154(b) by 0 days.

(21) Appl. No.: 18/457,657

(22) Filed: Aug. 29, 2023

(51) Int. Cl.
  *B25D 1/12* (2006.01)
  *B23P 9/04* (2006.01)
  *B25F 5/02* (2006.01)

(52) U.S. Cl.
  CPC .......... *B25D 1/12* (2013.01); *B23P 9/04* (2013.01); *B25F 5/02* (2013.01)

(58) Field of Classification Search
  CPC ..... B25D 1/12; B25D 1/00; B25F 5/02; B25F 5/00; B23P 9/04
  See application file for complete search history.

(56) References Cited

U.S. PATENT DOCUMENTS

| | | | |
|---|---|---|---|
| 1,109,507 A | | 9/1914 | Bostock |
| 1,835,180 A | * | 12/1931 | Parsons ............... B25D 17/005 173/202 |
| 2,866,266 A | * | 12/1958 | Hoeflich .............. B23P 15/406 30/168 |
| 3,074,155 A | * | 1/1963 | Hahn ................. H05K 13/0447 81/463 |
| 3,135,147 A | * | 6/1964 | Lau ....................... G01L 1/042 173/132 |
| 4,268,927 A | | 5/1981 | Bridwell |
| 4,450,919 A | * | 5/1984 | Cousineau ........... B25D 17/005 173/29 |
| 4,712,625 A | * | 12/1987 | Kress .................... B25D 16/00 173/104 |
| 5,255,575 A | | 10/1993 | Williams |
| 5,315,725 A | | 5/1994 | Vanden Heuvel |
| 5,638,909 A | * | 6/1997 | Henderson ............. B25D 17/00 227/147 |
| 6,370,993 B1 | * | 4/2002 | Pitstick .................. B25B 19/00 81/463 |
| 6,381,788 B2 | | 5/2002 | Wu |
| 6,530,098 B1 | | 3/2003 | Gringer et al. |
| 6,922,864 B2 | | 8/2005 | Clarke et al. |
| 7,086,109 B2 | | 8/2006 | Fisher et al. |
| 7,409,894 B1 | | 8/2008 | Valentine |

(Continued)

*Primary Examiner* — Lawrence Averick
(74) *Attorney, Agent, or Firm* — Dunlap Bennett & Ludwig, PLLC

(57) ABSTRACT

A hammer assembly for a power tool. The hammer assembly provides a first, proximal engagement portion couplable directly to a backside of the power. A second, distal engagement portion is directly connected to the first engagement portion. A head portion is directly connected to the second engagement portion. The second engagement portion provides one or more chambers, each chamber housing a spring for storing energy imparted by compressive forces against the head portion. Each spring directly interconnecting the first and second engagement portions through an open side of the chamber facing the first engagement portion. There is a gap between the first and second engagement portions, between their respective distal and proximal surface, which is spanned by the spring, enabling the latter to deflect before said surfaces contact under compressive loading.

9 Claims, 3 Drawing Sheets

(56) References Cited

U.S. PATENT DOCUMENTS

| | | | |
|---|---|---|---|
| 8,132,486 B1 * | 3/2012 | Calvert | B25B 21/00 81/25 |
| 8,387,188 B2 | 3/2013 | Murphy | |
| 9,242,360 B2 | 1/2016 | Gresham et al. | |
| 9,902,055 B1 | 2/2018 | Baker et al. | |
| 10,232,449 B2 | 3/2019 | Buhl et al. | |
| 2008/0301880 A1 * | 12/2008 | Calvert | B25F 1/00 7/143 |
| 2010/0071139 A1 | 3/2010 | Gallien | |
| 2010/0263133 A1 | 10/2010 | Langan | |
| 2010/0281621 A1 | 11/2010 | Moritz | |

* cited by examiner

HAMMER ASSEMBLY FOR A POWER TOOL

BACKGROUND OF THE INVENTION

The present invention relates to power tools accessories and methods of improving a power tool and, more particularly, to a hammer assembly to couple to a backside of a power to provide a hammer function thereto.

When using an impact drivers and related power tools adapted to drive a fastener, such as a screw, say, through high torque actuated output it becomes necessary to manually strike the driven fastener. For instance, to set the screw, ensure a flush surface of the screwhead relative to another object or surface. From time to time, when this need arrives, there is no hammer available, or it is a burden to shift gears from the power tool to the hammer and then back to the power tool. During such times, operators will commonly use the butt end of the power tool. Using the impact driver in such a makeshift manner, however, there is a risk of damaging the impact driver, either to the external casing or internal powered components.

As can be seen, there is a need for minimizing damage to impact drivers, drills, and nail guns by adding a hammer function to their backside.

SUMMARY OF THE INVENTION

The present invention enables an impact driver, power drill, nail gun or other power tools with hammer functionality that is designed and adapted to avoid damage to the underlying power tool.

The present invention includes a hammer assembly and method of assembling and associating the same on the backside of a power tool, thereby eliminating the need to a have a hammer during many construction jobs through turning one tool into a multifunctional tool.

In one aspect of the present invention, a hammer assembly for a power tool, the hammer assembly providing a distal engagement portion configured to operatively associated with a backside of the power tool by way of a first side of the distal engagement portion; the distal engagement portion having one or more chambers housing an energy storage device so that a portion of a compressive force applied to a second side of the distal engagement portion is absorbed by the energy storage device; and a head portion directly connected to said second side.

In another aspect of the present invention, the hammer assembly further provides a proximal engagement portion disposed between the backside and the distal engagement portion, wherein the proximal engagement portion is directly connected the backside and the distal engagement portion is directly connected to the proximal engagement portion so there is a gap therebetween, wherein the gap is in a direction extending from the first engagement portion to the backside; and further providing one or more protrusions projecting from a proximal surface of the distal engagement portion embedded; and for each said protrusion a cavity is provided along the distal surface of the proximal engagement surface for embedding the protrusion, wherein the gap is present between a proximal-most surface of each protrusion and a proximal-most surface of a respective cavity, wherein each chamber communicates with a distal surface of the proximal engagement portion, wherein for each chamber, the energy storage device is a spring that directly contacts the distal surface of the proximal engagement portion and a distal surface of the chamber, thereby spanning the gap, and wherein each engagement portion is made of an elastomeric material.

In yet another aspect of the present invention, a method of adding hammering functionality to a power tool, the method comprising attaching the above-mentioned hammer assembly to a backside of the power tool.

In still yet another aspect of the present invention, hammer assembly for a power tool, a hammer assembly for a power tool providing the following: a first engagement portion having a proximal surface, the proximal surface directly connected to a backside of the power tool; a second engagement portion connected to the first engagement portion by way of one or more protrusions of the second engagement portion embedded, wherein each protrusion is embedded in a cavity of the first engagement portion; a gap between the first and second engagement portions, wherein the gap is present between each cavity and embedded protrusion; and a head portion directly connected to a distal surface of the second engagement portion.

These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a hammer assembly for a power tool. The hammer assembly provides a first, proximal engagement portion couplable directly to a backside of the power. A second, distal engagement portion is directly connected to the first engagement portion. A head portion is directly connected to the second engagement portion. The second engagement portion provides one or more chambers, each chamber housing a spring for storing energy imparted by compressive forces against the head portion. Each spring directly interconnecting the first and second engagement portions through an open side of the chamber facing the first engagement portion. There is a gap between the first and second engagement portions, between their respective distal and proximal surface, which is spanned by the spring, enabling the latter to deflect before said surfaces contact under compressive loading.

Figure 1:
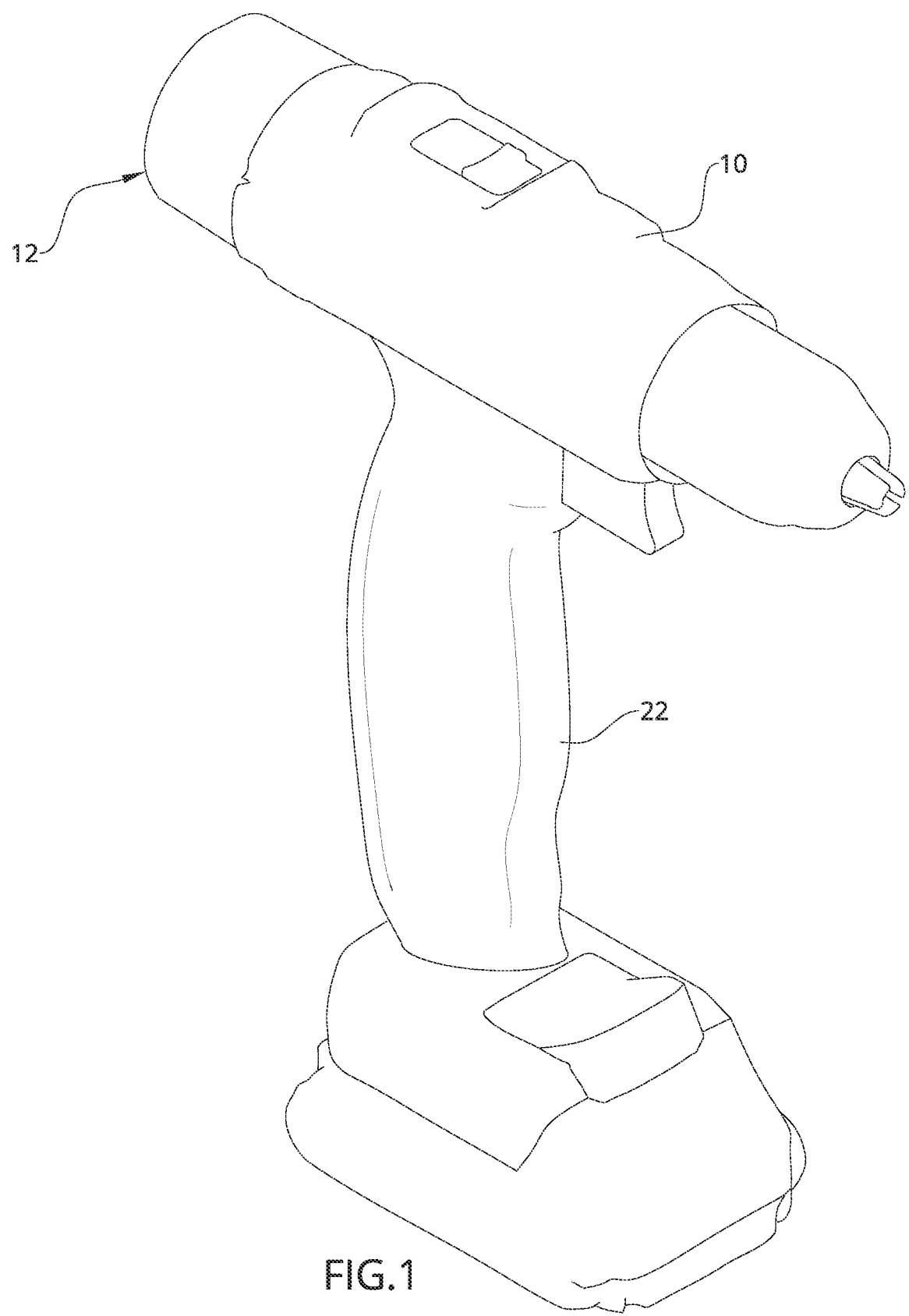
FIG. 1 is a perspective view of an exemplary embodiment of the present invention.
Figure 2:
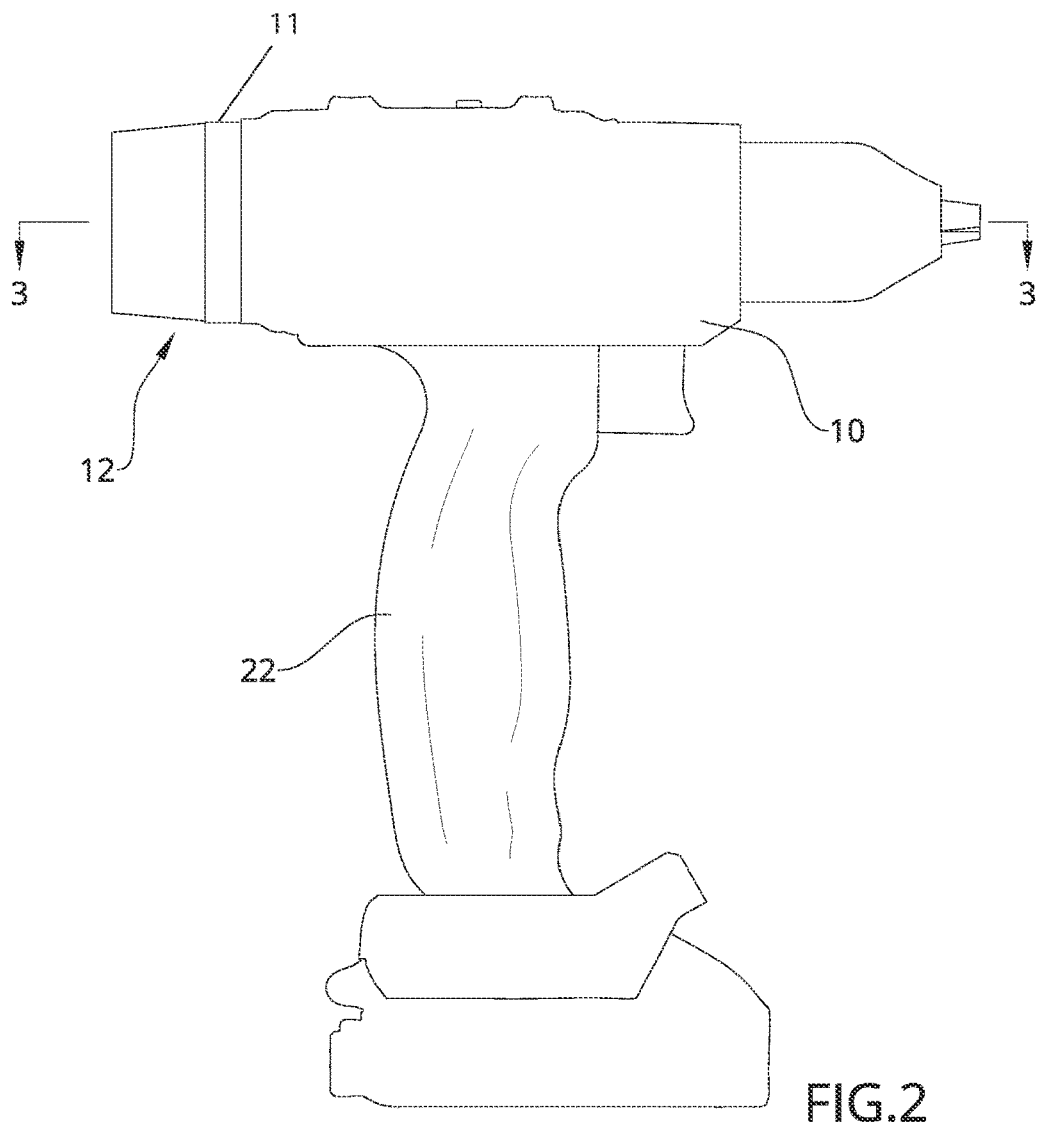
FIG. 2 is a side elevation view of an exemplary embodiment of the present invention.
Figure 3:
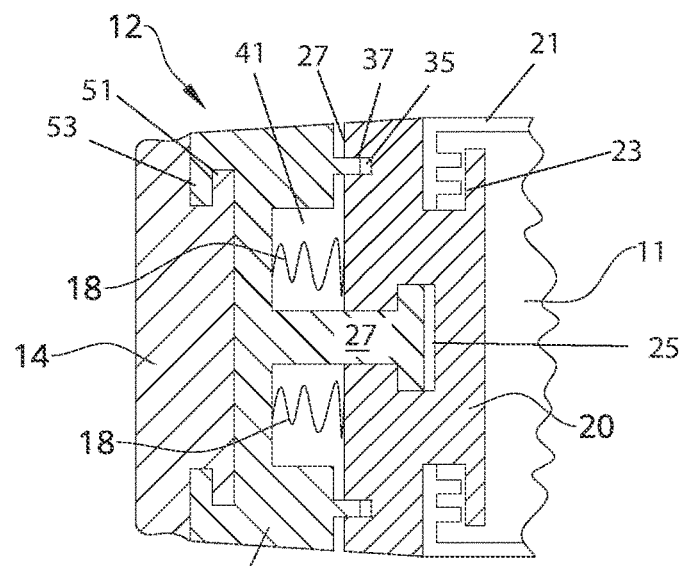
FIG. 3 is a detailed section view of an exemplary embodiment of the present invention, taken along a portion of line 3-3 in FIG. 2.
Figure 4:
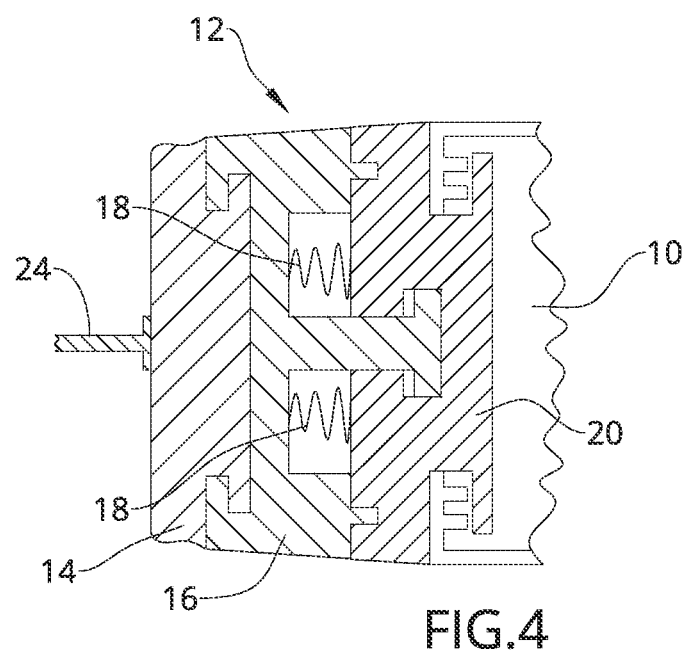
FIG. 4 is FIG. 3, shown in use hitting a fastener 24.

Referring to FIGS. 1 through 4, the present invention may include a method for improving a power tool 10 designed to deliver high torque output or other actuated functionality so that a backside of the power tool 10 is enabled with hammering functionality. Likewise, the present invention discloses a hammer assembly 12 for mounting to a backside of the power tool 12.

Power tool 10 may include an impact drill, an impact wrench, nail gun, power drill or the like. And as such, the power tool 10 has an operative end for power-actuated for driving a fastener. The opposing end of the power tool 10, hereinafter referred to as the "backside" 11, is typically a flat surface. Between the operative end and the backside 11 is a handle 22.

The present invention may include a hammer assembly 12 that is dimensioned and shaped to operatively associate with the backside 11 of the power tool 10. The hammer assembly 12 may include a first engagement portion 20 that directly connects to the backside 11. The first engagement portion 20 may fastener to the backside 11 by way of pressure flanges 21, clasp mechanisms 23, adhesive, or the like. The first engagement portion 20 may have a cavity 25 recessed into a distal surface 27 thereof.

The hammer assembly 12 may provide a second engagement portion 16 dimensioned and adapted to directly connect to the distal surface 27 of the first engagement portion 20. Such connections may be formed by way of a plug 35 dimensioned and shaped to form a locked engagement with the cavity 25. Also, connectors 37 may protrude from the second engagement portion 16 so as to directly connect and be embedded in the distal surface 27 of the first engagement portion 20. Throughout the interface between the first and second engagement portion 16, 20 is a gap-even between ends of the protrusions 37, 25 projecting from a proximal surface of the distal engagement portion and their respective cavities 25, 35 they are embedded in. The gap may be between approximately a quarter of a millimeter and two millimeters.

The second engagement portion 16 provides one or more spring chambers 41 open to and directly communicating with distal surface 27 of the first engagement portion 20. Within each spring chamber 41 is housed a spring 18 (or other device that can store energy when compressed) so that one end of the spring 18 engages the distal surface 27 of the first engagement portion 20, while the other end of the spring 28 engages a distal surface of the chamber 41. Accordingly, compressive force exerted on the second engagement portion 16 is stored in the spring 18 by way of its resulting deflection, thereby absorbing impact of force at a distal end of the second engagement portion 16.

A head portion 14 may directly connect to a distal surface of the second engagement portion 16 by the way of mating first and second recess groves 51 and 53. The head portion 14 may be made of steel or other hard materials durable enough for hammering purposes. The engagement portions 16, 20 may be made of rubber or other natural or synthetic elastomeric material providing sufficient elasticity suitable for the shock absorbers functionality and mounting functionality disclosed herein.

The engagement portions 16, 20 connect to each other to reduce impact on the backside 11 and thus the main housing of the power tool 10.

A method of using the present invention may include the following. The hammer assembly 12 disclosed above is provided. A user would attach it to the backside of their power tool 10 so that when the need to hammer a fastener 24 arose with using the power tool 10 as intrinsically contemplated, the user could turn the power tool 10 around, and by using the same handle 12, hammer the fastener 24 using the head portion 14. As a result, rather than having to hold two pieces of equipment, the present invention allows the power tool 10 to be used as a hammer device without damaging the housing or internal components of the power tool 10.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A hammer assembly for a power tool, the hammer assembly comprising:
   a distal engagement portion configured to operatively associated with a backside of the power tool by way of a first side of the distal engagement portion;
   the distal engagement portion having one or more chambers housing an energy storage device so that a portion of a compressive force applied to a second side of the distal engagement portion is absorbed by the energy storage device; and
   a head portion directly connected to said second side.

2. The hammer assembly of claim 1, further comprising a proximal engagement portion disposed between the backside and the distal engagement portion.

3. The hammer assembly of claim 2, wherein the proximal engagement portion is directly connected the backside, and wherein the distal engagement portion is directly connected to the proximal engagement portion so there is a gap therebetween.

4. The hammer assembly of claim 3, wherein the gap is in a direction linearly extending from the first engagement portion to the backside.

5. The hammer assembly of claim 4, further comprising one or more protrusions projecting from a proximal surface of the distal engagement portion; and for each said protrusion a cavity is provided along the distal surface of the proximal engagement surface embedding the protrusion, wherein the gap is present between a proximal-most surface of each protrusion and a proximal-most surface of its cavity.

6. The hammer assembly of claim 5, wherein each chamber communicates with a distal surface of the proximal engagement portion.

7. The hammer assembly of claim 6, wherein for each chamber, the energy storage device is a spring that directly contacts the distal surface of the proximal engagement portion and a distal surface of the chamber, thereby spanning the gap.

8. The hammer assembly of claim 7, wherein each engagement portion is made of an elastomeric material.

9. A hammer assembly for a power tool, the hammer assembly comprising:
- a first engagement portion having a proximal surface, the proximal surface directly connected to a backside of the power tool;
- a second engagement portion connected to the first engagement portion by way of one or more protrusions of the second engagement portion embedded, wherein each protrusion is embedded in a cavity of the first engagement portion;
- a gap between the first and second engagement portions, wherein the gap is present between each cavity and embedded protrusion; and
- a head portion directly connected to a distal surface of the second engagement portion.

* * * * *